(12) United States Patent
Huang et al.

(10) Patent No.: US 12,507,304 B2
(45) Date of Patent: Dec. 23, 2025

(54) SYSTEM AND METHOD FOR SUPPORTING ACCESS TRAFFIC STEERING, SWITCHING AND SPLITTING-ENABLED EVOLVED PACKET DATA GATEWAY

(71) Applicant: Verizon Patent and Licensing Inc., Basking Ridge, NJ (US)

(72) Inventors: Chien-Yuan Huang, Basking Ridge, NJ (US); Suzann Hua, Beverly Hills, CA (US); Amir Hossein Khastoo, Renton, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 380 days.

(21) Appl. No.: 18/340,937

(22) Filed: Jun. 26, 2023

(65) Prior Publication Data
US 2024/0430966 A1    Dec. 26, 2024

(51) Int. Cl.
*H04W 76/16* (2018.01)
*H04W 60/04* (2009.01)
*H04W 84/12* (2009.01)

(52) U.S. Cl.
CPC ........... *H04W 76/16* (2018.02); *H04W 60/04* (2013.01); *H04W 84/12* (2013.01)

(58) Field of Classification Search
CPC ...... H04W 76/16; H04W 60/04; H04W 84/12
See application file for complete search history.

(56) References Cited

U.S. PATENT DOCUMENTS

2020/0389931 A1\* 12/2020 Kumar .................. H04W 76/16
2021/0092664 A1\*  3/2021 Lai ......................... H04W 8/08
2022/0053603 A1\*  2/2022 Talebi Fard .......... H04W 76/11

\* cited by examiner

*Primary Examiner* — Mohammad S Anwar

(57) ABSTRACT

Systems and methods described herein enable 5G core session management function (SMF)/user plan function (UPF) relocation to support ATSSS-enabled evolved packet data gateways (ePDG). An ePDG receives an access traffic steering, switching and splitting (ATSSS) trigger message from a user equipment (UE) device. The UE device is connected via a first session using a session management function (SMF) and a via a second session using a packet data network gateway (PGW). The ATSSS trigger message includes an SMF identifier for the SMF. The ePDG sends, in response to the ATSSS trigger message, a request to the SMF to merge the first session and the second session into a single registration.

20 Claims, 7 Drawing Sheets ion (5G) mobile networks, are being implemented as the next evolution of mobile wireless networks. 5G mobile networks are designed to increase data transfer rates, increase spectral efficiency, improve coverage, improve capacity, and reduce latency. While 5G networks are being deployed and evolving, 5G devices need to be supported in legacy networks, such as Long-Term Evolution (LTE) networks that use an Evolved Packet Core (EPC). User devices associated with a 5G New Radio (NR) system may have the capability to communicate via a 5G network, as well as communicate via other network components, such as EPC network functions.

SYSTEM AND METHOD FOR SUPPORTING ACCESS TRAFFIC STEERING, SWITCHING AND SPLITTING-ENABLED EVOLVED PACKET DATA GATEWAY

BACKGROUND

Next Generation mobile networks, such as Fifth Generation (5G) mobile networks, are being implemented as the next evolution of mobile wireless networks. 5G mobile networks are designed to increase data transfer rates, increase spectral efficiency, improve coverage, improve capacity, and reduce latency. While 5G networks are being deployed and evolving, 5G devices need to be supported in legacy networks, such as Long-Term Evolution (LTE) networks that use an Evolved Packet Core (EPC). User devices associated with a 5G New Radio (NR) system may have the capability to communicate via a 5G network, as well as communicate via other network components, such as EPC network functions.

DETAILED DESCRIPTION

The following detailed description refers to the accompanying drawings. The same reference numbers in different drawings may identify the same or similar elements. Also, the following detailed description does not limit the invention.

Access Traffic Steering, Switching and Splitting (ATSSS) is a special feature to enable an operator/network to offload a high bandwidth application to a non-cellular network, such as a wireless local area network (WLAN) path using Wi-Fi. With ATSSS, both cellular access and non-cellular access may be used simultaneously. An evolved Packet Data Gateway (ePDG) is the network function responsible for interworking between the Evolved Packet Core (EPC) of the Fourth Generation (4G) mobile network and other networks that require secure access, such as a WLAN. Even though the ePDG is an EPC network function, it continues to serve as the Wi-Fi gateway in initial 5G Core (5GC) deployments (e.g., a Non-Standalone deployment).

5G network functions, such as a session management function (SMF) and packet data network (PDN) gateway (PGW), may be selected by the network based on proximity to an end user, among other factors. Since the ePDG is an internet-facing network function, the selection of an SMF or PGW for a session is typically based on the internet provider Internet Protocol (IP) domain. Therefore, the SMF of the cellular data path connection might be different from the SMF selected by the current ePDG SMF/PGW node selection procedure. In order to support ATSSS under the ePDG environment, the relocation of the ePDG-connected SMF to the cellular-connected SMF is required to maintain the session service continuity.

Systems and methods described herein enable 5GC SMF/ user plane function (UPF) relocation to support ATSSS-enabled ePDGs. The ePDG is upgraded with new functionality to support ATSSS for 5G networks and avoid fallback to 4G networks for ePDG connected sessions. According to an implementation, an ePDG receives an ATSSS trigger message from a user equipment (UE) device when the UE device is connected with a first session (e.g., a 5G cellular session) using a SMF and a second session (e.g., a WLAN session) using a PGW. The ATSSS trigger message may include an SMF identifier for the SMF. The ePDG may extract the SMF identifier and send, in response to the ATSSS trigger message, a request to the SMF to merge the first session and the second session into a single registration.

Figure 1:
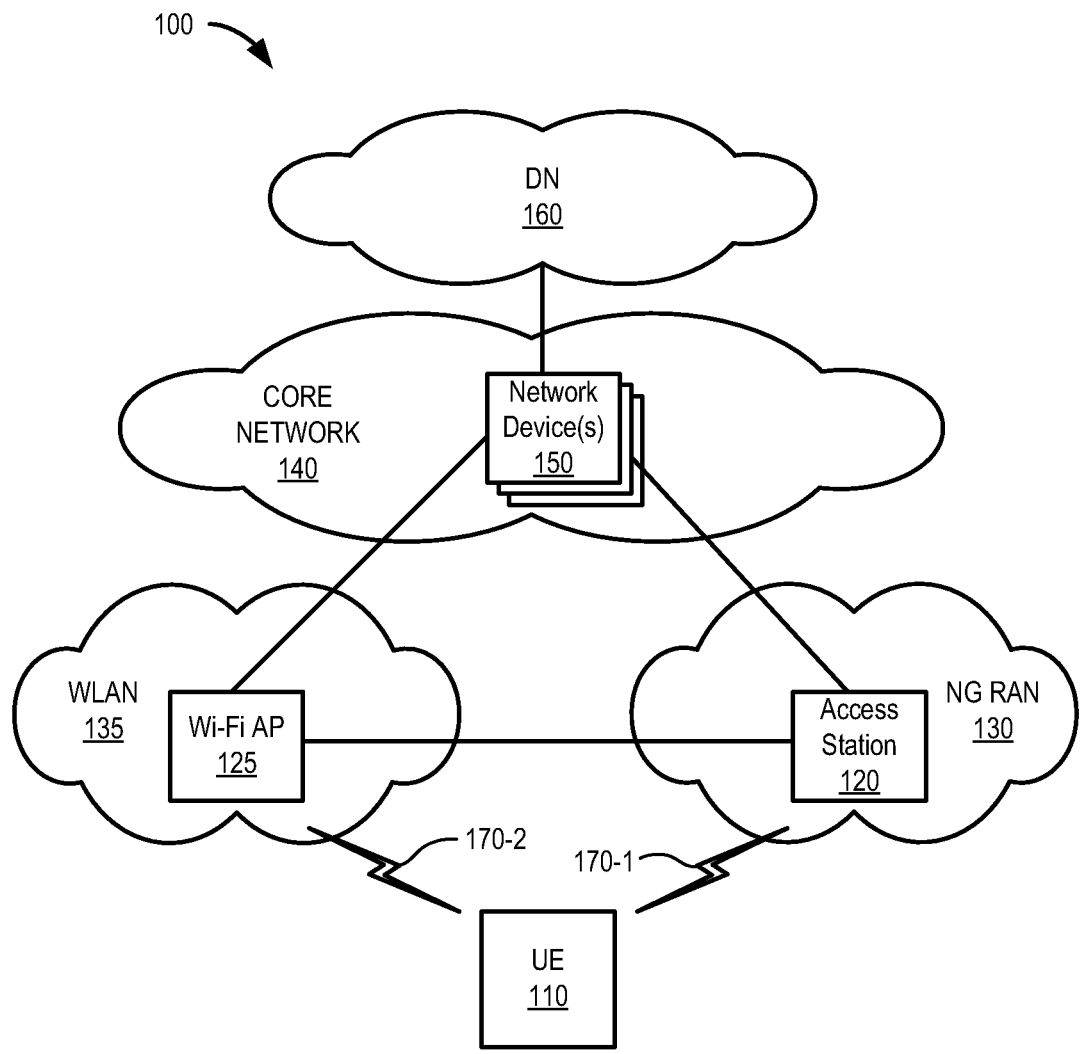
FIG. 1 is a diagram illustrating a network environment according to an implementation described herein.

FIG. 1 is a diagram of an exemplary environment 100 in which the systems and/or methods, described herein, may be implemented. As shown in FIG. 1, environment 100 may include a UE 110, an access station 120 for a radio access network (RAN) 130, an access point (AP) 125 for a wireless LAN 135, a core network 140 with network devices 150, and a data network (DN) 160. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communicative connection may involve an intermediary device and/or an intermediary network not illustrated in FIG. 1. Additionally, the number and the arrangement of links illustrated in environment 100 are exemplary.

In the configuration of FIG. 1, UE 110 may use wireless channels 170-1 and 170-2 (referred to collectively as wireless channels 170) to connect to access station 120 and access point 125, respectively. Wireless channels 170 may correspond, for example, to physical layer protocols in accordance with different radio access technology (RAT) types. For example, wireless channel 170-1 may correspond to physical layer protocols for 5G RAN standards (e.g., 3GPP standards for 5G air interfaces, collectively referred to herein as "5G"), while wireless channel 170-2 may correspond to physical layer protocols for Wi-Fi standards.

UE 110 may include any type of mobile device having multiple coverage mode capabilities, and thus communicate with different access stations (e.g., access stations 120) using different wireless channels (e.g., channels 170) corresponding to the different RANs (e.g., RAN 130) or WLANs (e.g., WLAN 135). UE 110 may include, for example, a cellular radiotelephone, a smart phone, a tablet, any type of internet protocol (IP) communications device, a Voice over Internet Protocol (VOIP) device, a laptop computer, a wearable computer, a gaming device, a media player device, or a digital camera that includes communication capabilities (e.g., wireless communication mechanisms, such as Wi-Fi). In other implementations, UE 110 may be implemented as a machine-type communications (MTC) device, an Internet of Things (IoT) device, a machine-to-machine (M2M) device, etc. According to implementations described herein, UE 110 may be provisioned (e.g., via a subscriber identity module (SIM) card or another secure element) to recognize particular network identifiers (e.g., associated with RAN 130) and to support particular radio frequency (RF) spectrum ranges. UE 110 may support wireless communications using 5G, 4.5G, 4G, and other air interfaces. Additionally, UE 110 may support simultaneous carrier aggregation of different RAT types (e.g., 4G and 5G NR). Access station 120 may include a network device that has computational and wireless communication capabilities. Access station 120 may include a transceiver system that connects UE 110 to other components of RAN 130 and core network 140 using wireless/wired interfaces. Access station 120 may be implemented as a base station (BS), a base transceiver station (BTS), a Node B, an evolved Node B (eNB), an evolved LTE (eLTE) eNB, a next generation Node B (gNB), a remote radio head (RRH), an RRH and a baseband unit (BBU), a BBU, or other type of wireless node (e.g., a picocell node, a femtocell node, a microcell node, etc.) that provides wireless access to RAN 130. Each access station 120 may support a RAN 130 having different RAT-types. For example, in one implementation, RAN 130 may include a 5G RAN.

Access point 125 may include a device with a transceiver configured to communicate with UE 110 using Wi-Fi signals based on the Institute of Electrical and Electronics Engineers (IEEE) 802.11 standards for implementing a wireless LAN (WLAN) network. Wi-Fi AP 125 may enable UE 110 to communicate with other devices in Wi-Fi WLAN network 135 and with other devices in core network 140 via an ePDG (not shown in FIG. 1).

Core network 140 may include one or multiple networks of one or multiple types. According to an exemplary implementation, core network 140 includes a network pertaining to multiple RANs 130. For example, core network 140 may include the core part of a 5G network, an LTE network, an LTE-A network, a legacy network, and so forth.

Depending on the implementation, core network 140 may include various network elements that may be implemented in network devices 150. Such network elements may include a mobility management entity (MME), a UPF, a SMF, a core access and mobility management function (AMF), a unified data management (UDM), a PGW, a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 140. As described further herein, in the context of a non-standalone 5G network that is configured to support 5G UEs, core network 140 may include one or more network devices 150 with combined 4G and 5G functionality, such as a combined SMF+PGW-C and a combined user plane function with PDN gateway-user plane (UPF+PGW-U).

DN 160 may include one or more networks, such as a local area network (LAN), a wide area network (WAN), a metropolitan area network (MAN), a telephone network, the Internet, etc., capable of communicating with UEs 110. In one implementation, DN 160 includes a network that provides data services (e.g., via packets or any other IP datagrams) to UE 110.

According to implementations described herein, UE 110 may be equipped to send ATSSS trigger messages to 3GPP network functions, such as an ePDG, to initiate merging of separate 5G cellular sessions and WLAN sessions with a single registration to an SMF in the 5GC. The number and arrangement of devices in environment 100 are exemplary. According to other embodiments, environment 100 may include additional devices and/or differently arranged devices, than those illustrated in FIG. 1.

Figure 2:
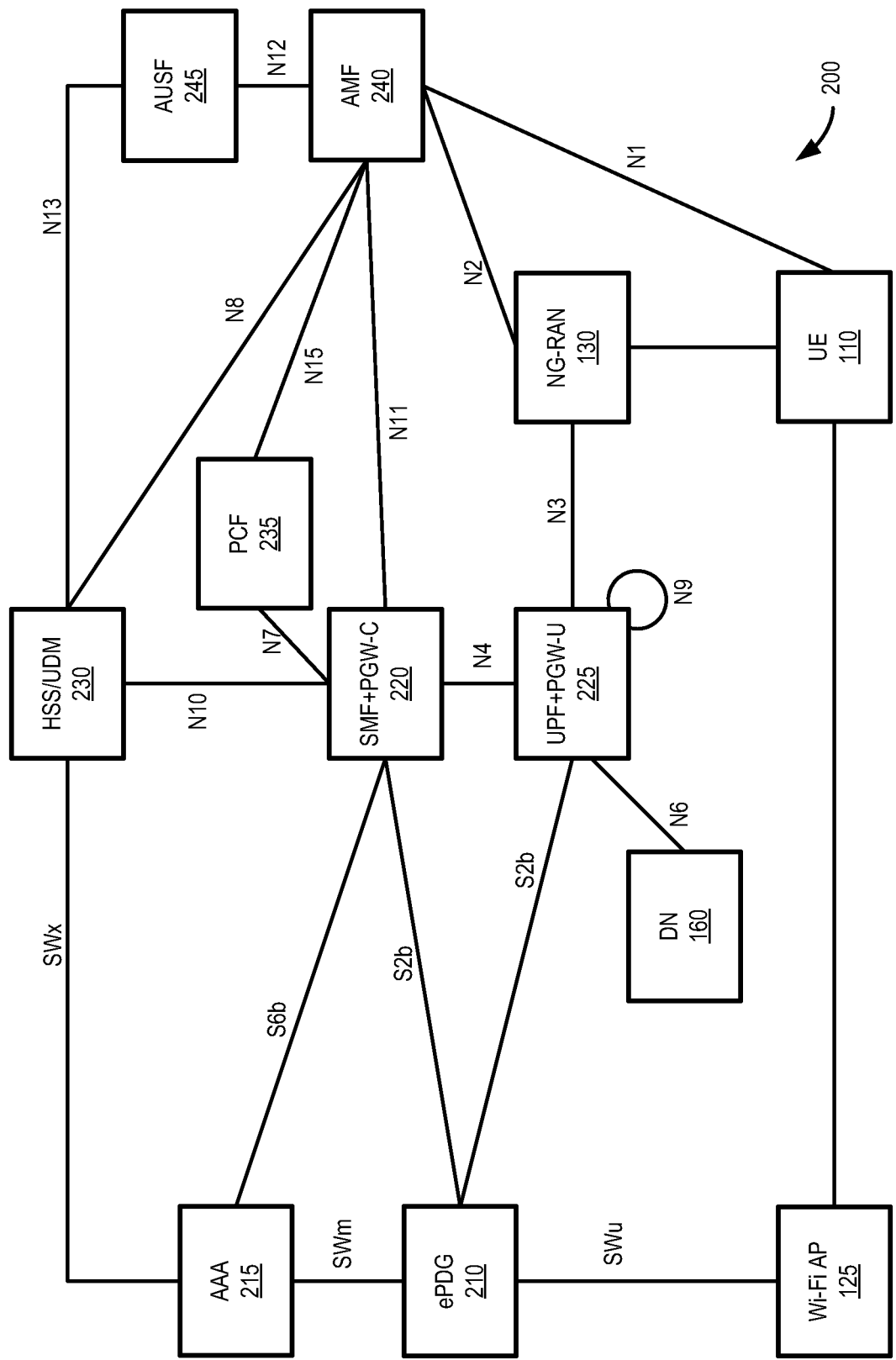
FIG. 2 is a diagram illustrating connections among devices in an exemplary portion of the network environment of FIG. 1.

FIG. 2 is a block diagram illustrating an ePDG connection with a 5GC architecture in a portion 200 of network environment 100. In the configuration of FIG. 2, 5G connectivity capability is provided for a UE 110 to 5G-RAN (via an access station 120, not shown) and WLAN connectivity is provided for UE 110 via Wi-Fi access point 125 and an ePDG 210. Network portion 200 may include network devices 150 from core network 140 of a non-standalone 5G network that supports UE 110. As shown in FIG. 2, network portion 200 may further include an authentication, authorization, and accounting (AAA) function 215, an SMF+PGW-C 220, a UPF+PGW-U 225, an HSS/UDM 230, a policy control function (PCF) 235, an AMF 240, and an authentication server function (AUSF) 245. In other implementations, core network 140 may include other network elements 150 associated with a 4G core and/or a 5G core.

For an end device (e.g., UE 110) to acquire wireless service of a network, the end device establishes a wireless connection (e.g., a Radio Resource Control (RRC) connection) with a RAN (e.g., Next Generation (NG)-RAN 130), and may authenticate, register, and establish a bearer with a core network (e.g., core network 140). Typically, as part of an attachment procedure with the core network, the end device receives policies from the core network. For example, the policies may include a policy pertaining to route selection for outgoing traffic, and a policy pertaining to network discovery and selection.

As shown in FIG. 2, ePDG 210 may include a network device that interfaces core network 140 with devices in untrusted networks, such as a Wi-Fi access point 125. ePDG 210 may establish a connection between Wi-Fi access point 125 and UPF+PGW-U 225 after UE 110 has been authenticated and authorized (e.g., by AAA 215). ePDG 210 may communicate with UPF+PGW-U 225 through an S2b interface implemented, for example, using GTPv2. According to implementations described herein, ePDG 210 may receive an ATSSS trigger message from UE device 110 (e.g., via Wi-Fi access point 125). The ATSSS trigger message may include an SMF identifier (e.g., an IP address, network address, etc.) for the SMF servicing a 5G cellular connection for UE device 110 (e.g., SMF+PGW-C 220). In response to the ATSSS trigger message, ePDG 210 may send a request to SMF+PGW-C 220 to merge the first session and the second session into a single registration, thus enabling both the WLAN session and the 5G cellular sessions to use the 5GC. For example, ePDG 210 may communicate with SMF+PGW-C 220 via an S2b interface using Diameter protocol.

SMF+PGW-C 220 may include a network device (e.g., a converged node) that provides SMF functionality for 5G and PGW control plane functionality for 4G. Thus, in one implementation, SMF+PGW-C 220 may be treated as a single network entity that provides/retrieves information for both 4G and 5G core network functions. SMF+PGW-C 220 may perform session establishment, modification, and/or release, perform IP address allocation and management, perform Dynamic Host Configuration Protocol (DHCP) functions, perform selection and control of UPF+PGW-U 225, configure traffic steering at UPF+PGW-U 225 to guide traffic to the correct destination, terminate interfaces toward PCF 235, perform lawful intercepts, charge data collection, support charging interfaces, control and coordinate charging data collection, terminate session management parts of network access stratum (NAS) messages, perform downlink data notification, manage roaming functionality, and/or perform other types of control plane processes for managing user plane data.

UPF+PGW-U 225 may include a network device (e.g., a converged node) that provides UPF functionality for 5G and PGW user plane functionality for 4G. SMF+PGW-C 220 may maintain an anchor point for intra/inter-RAT mobility, maintain an external protocol data unit (PDU) point of interconnection to a data network (e.g., DN 160), perform packet routing and forwarding, perform the user plane part of policy rule enforcement, perform packet inspection, perform lawful intercept, perform traffic usage reporting, enforce quality-of-service (QOS) policies in the user plane, perform uplink traffic verification, perform transport level packet marking, perform downlink packet buffering, send and forward an "end marker" to a RAN node (e.g., access station 120), and/or perform other types of user plane processes. UPF+PGW-U 225 may communicate with SMF+PGW-C 220 using an N4 interface and may connect to DN 160 using an N6 interface.

PCF 235 may provide policies/rules to control plane network devices and make policy decisions based on subscription information, among other functions. AMF 240 may perform registration management, connection management, reachability management, mobility management, lawful intercepts, Short Message Service (SMS) transport, session management message transport between UE device 110 and SMF+PGW-C 220, access authentication and authorization, location services management, functionality to support non-3GPP access networks, and/or other types of management processes. AUSF 245 may perform authentication. For example, AUSF 245 may implement an Extensible Authentication Protocol (EAP) authentication server and may store authentication keys for UE devices 110.

Although FIG. 2 shows exemplary components of network portion 200, in other implementations, network portion 200 may include fewer components, different components, differently-arranged components, or additional components than depicted in FIG. 2. Additionally, or alternatively, one or more components of network portion 200 may perform functions described as being performed by one or more other components of network portion 200.

Figure 3A:
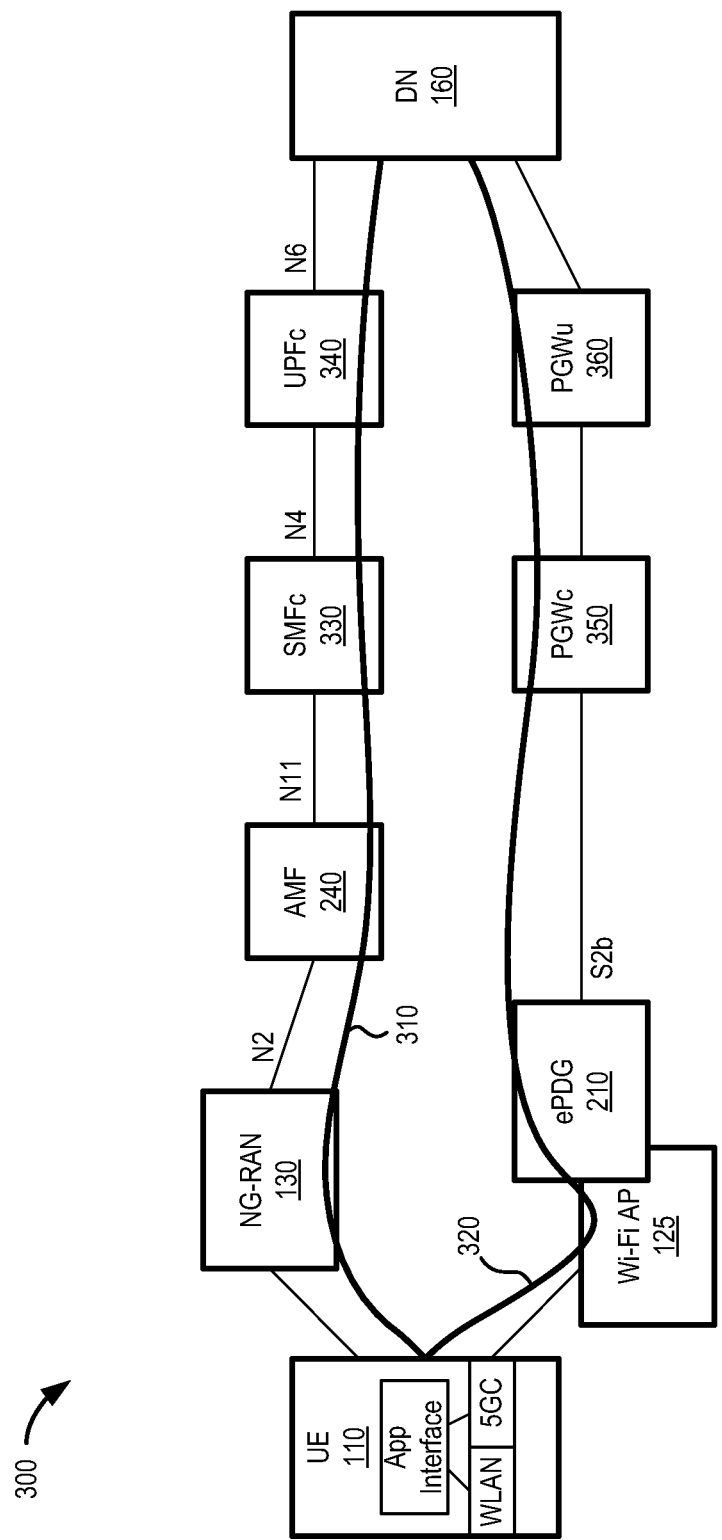
FIG. 3A is a block diagram illustrating dual registration while a user equipment (UE) device is connected to separate networks.

FIG. 3A is a block diagram illustrating dual registration in a network portion 300 while a UE 110 is connected separately to a 5GC and Wi-Fi network. UE 110 may support dual connectivity with 5G cellular and Wi-Fi, and may connect to send/receive data via different data streams. As shown in FIG. 3A, a first Protocol Data Unit (PDU) session 310 may be established using 5GC components (e.g., AMF 240, SMF 330, and UPF 340) via NG RAN 130. A second PUD session, WLAN PDU session 320, may be established using 4G-compatable network functions (e.g., a PGW control plane function 350 and PGW user plane function 360) via Wi-Fi access point 125 and ePDG 210.

Figure 3B:
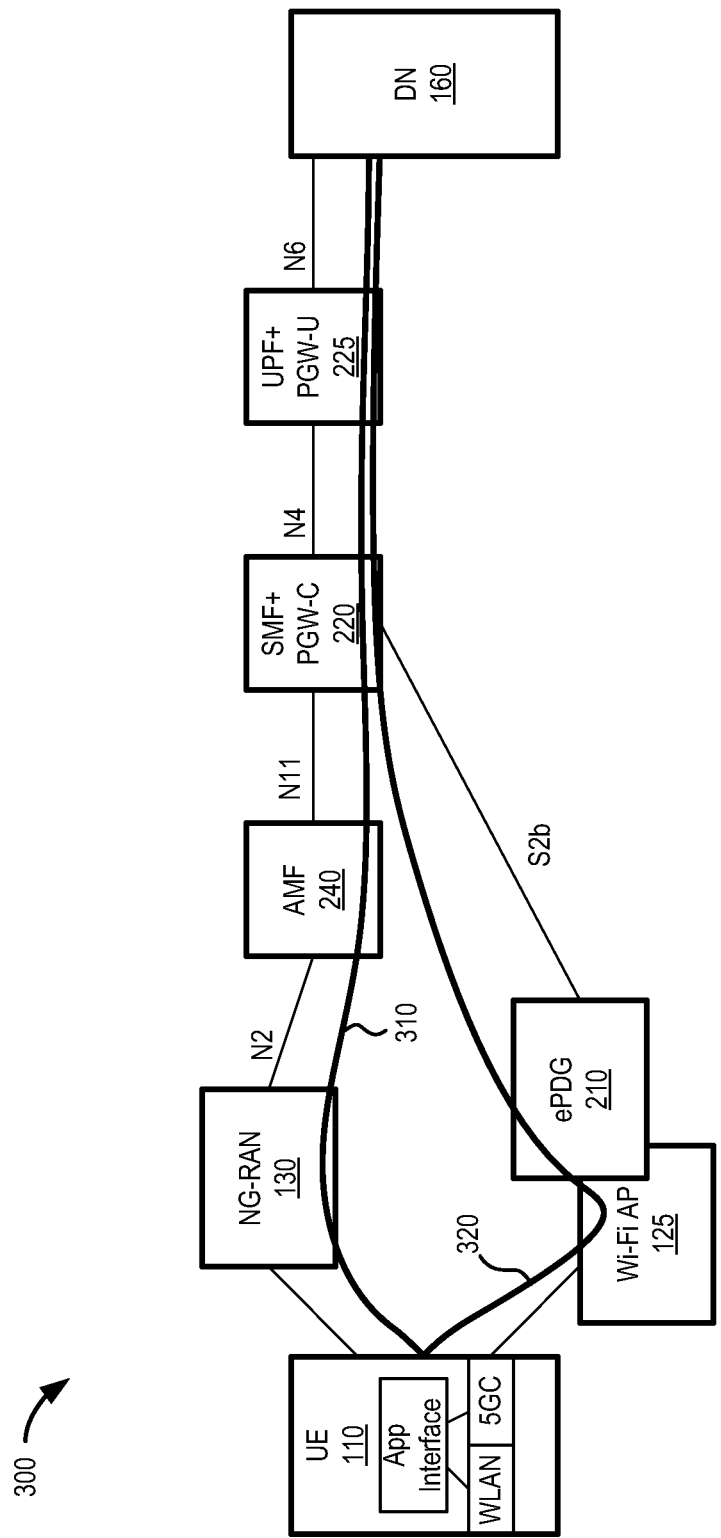
FIG. 3B is a block diagram illustrating network function relocation to complete a single registration for the sessions in FIG. 3A.

FIG. 3B is a block diagram illustrating SMF and UPF relocation in network portion 300 to complete a single registration/session. Selection of new 5GC network functions may be determined via a Network Function Repository (NRF, not shown). The NRF may, for example, apply technical specifications to select a SMF/PGW-C combination and with a consideration of location to provide low latency. From AMF 240, cellular PDU session 310 may be redirected through SMF+PGW-C 220 and UPF+PGW-U 225 to data network 160. From ePDG 210, WLAN PDU session 320 may also be redirected through SMF+PGW-C 220 and UPF+PGW-U 225 to data network 160.

Figure 4:
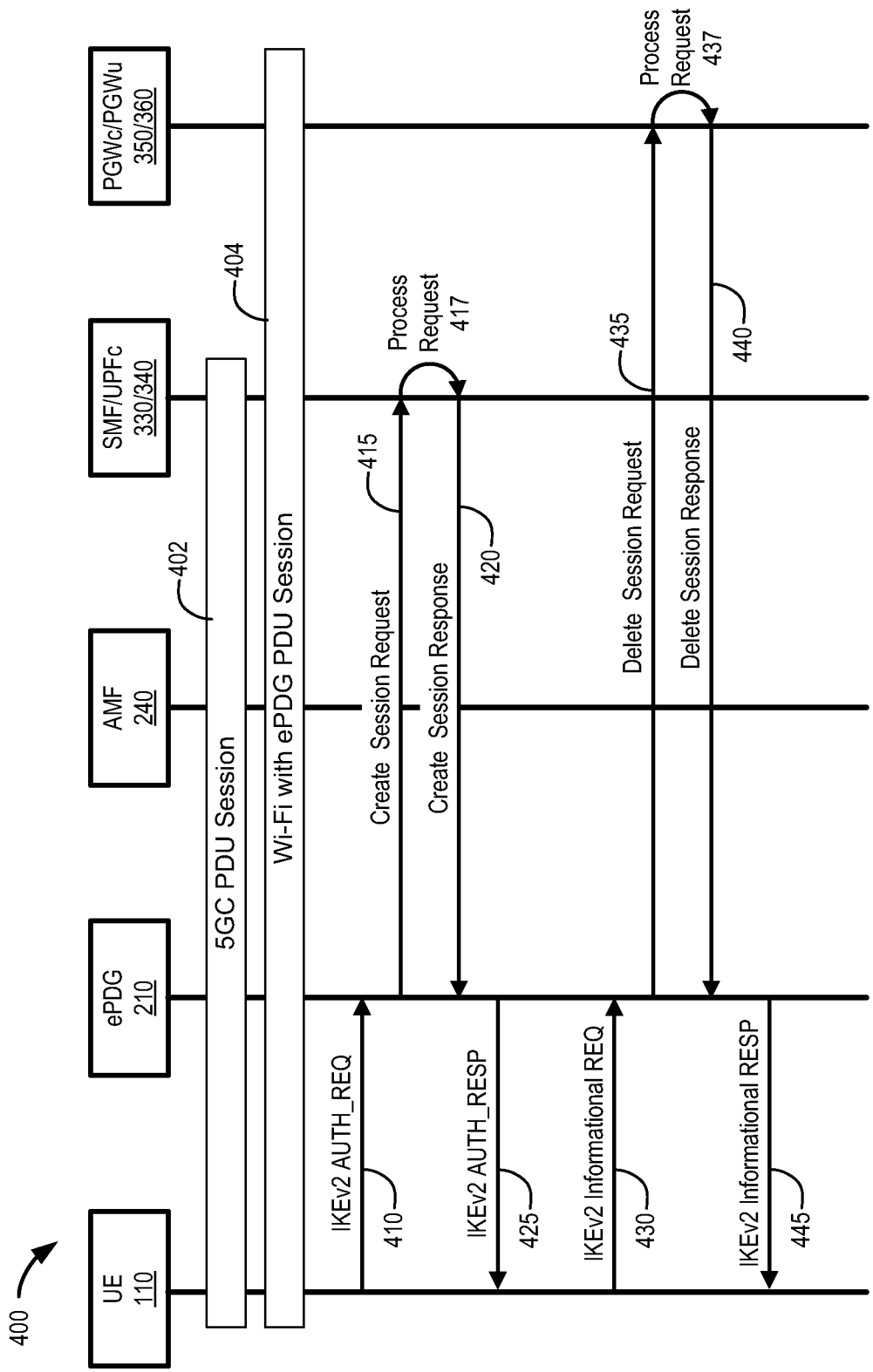
FIG. 4 is a block diagram illustrating exemplary communications for initiating network function relocation to complete the single registration.

FIG. 4 is a diagram illustrating exemplary communications for initiating SMF and UPF relocation to complete a single registration in a portion 400 of network environment 100. Network portion 400 may include UE 110, ePDG 210, AMF 240, a SMF/UPFc pair 330/340 and PGWc/PGWu pair 350/360, where the "c" represents the control plane and the "u" represents the user plane. Communications shown in FIG. 4 provide simplified illustrations of communications in network portion 400 and are not intended to reflect every signal or communication exchanged between devices.

As shown in FIG. 4, assume UE 110 has established a 5GC PDU session 402 using SMF/UPFc 330/340 and a separate ePDG PDU session 404 using PGWc/PGWu pair 350/360. UE 110 may submit an ATSSS trigger 410 to request ATSSS services from ePDG 210. ATSSS trigger 410 may use a virtual private network (VPN) protocol, such as an IKEv2 AUTH_REQ message with two new information elements. The first new information element may be an indicator to initiate ATSSS. The second new information element may be 5GC SMF information (e.g., a network address/locator for the SMF currently servicing 5GC PDU session 402), which is known to UE 110 from ePDG PDU session 404.

ePDG 210 may receive ATSSS trigger 410. In response to ATSSS trigger 410, ePDG 210 may submit a create session request to SMF/UPFc 330/340. For example, ePDG 210 may provide a create session request 415 to SMF 330 via an S2b interface, and SMF 330 may communicate with UPFc 340 via an N4 interface to establish a bearer for the ePDG PDU session 404. Create session request 415 may require handover of an existing PDN context (e.g., for ePDG PDU session 404).

SMF/UPFc 330/340 may receive create session request 415. In response to the create session request, SMF/UPFc 330/340 may process the request 417 to create a session for ePDG PDU session 404. For example, SMF/UPFc 330/340 may retrieve session management subscription data, retrieve subscriber profile parameters, apply policies/charging parameters for the session, apply a QoS profile to the prospective bearer, etc. Assuming a session is successfully created, SMF/UPFc 330/340 may transmit a create session response 420 to ePDG 210.

ePDG 210 may receive create session response 420 and may, in turn, provide a ATSSS trigger response 425 to UE 110. ATSSS trigger response 425 may indicate ATSSS services via ePDG 210 have been successfully established. ATSSS trigger response 425 may use the same protocol as ATSSS trigger 410, such as an IKEv2 AUTH_RESP message.

After successfully establishing the session using SMF/UPFc 330/340, UE 110 may initiate action to delete the session using 4G network components (e.g., PGWc/PGWu pair 350/360). UE 110 may submit a delete session trigger 430 to ePDG 210 to end the old session associated with PGWc/PGWu pair 350/360. Delete session trigger 430 may use a VPN protocol, such as an IKEv2 informational request message that identifies the session on PGWc/PGWu pair 350/360.

ePDG 210 may receive delete session trigger 430. In response to delete session trigger 430, ePDG 210 may submit a delete session request to PGWc/PGWu pair 350/360. For example, ePDG 210 may provide a delete session request 435 to PGWc 350 via an S2b interface, and PGWc 350 may communicate with PGWu 360 to terminate the session for the ePDG PDU session 404.

PGWc/PGWu pair 350/360 may receive delete session request 435. In response to the delete session request, PGWc/PGWu pair 350/360 may process the request 437 to terminate the session over PGWc/PGWu pair 350/360 and transmit a delete session response 440 to ePDG 210.

ePDG 210 may receive delete session response 440 and may, in turn, provide a delete session trigger response 445 to UE 110. Delete session trigger response 445 may use the same protocol as delete session trigger 410, such as an IKEv2 informational response message.

In the example of FIG. 4, the SMF and UPF are a pair (e.g., SMF/UPFc 330/340), and if there is a need, the SMF (e.g., SMF 330) can re-select a UPF after relocation of the Wi-Fi PDU session. If ePDG reselection happens after the SMF/UPF merge into a single registration, the create session request procedure can be performed between new ePDG and SMF/UPF pair.

Figure 5:
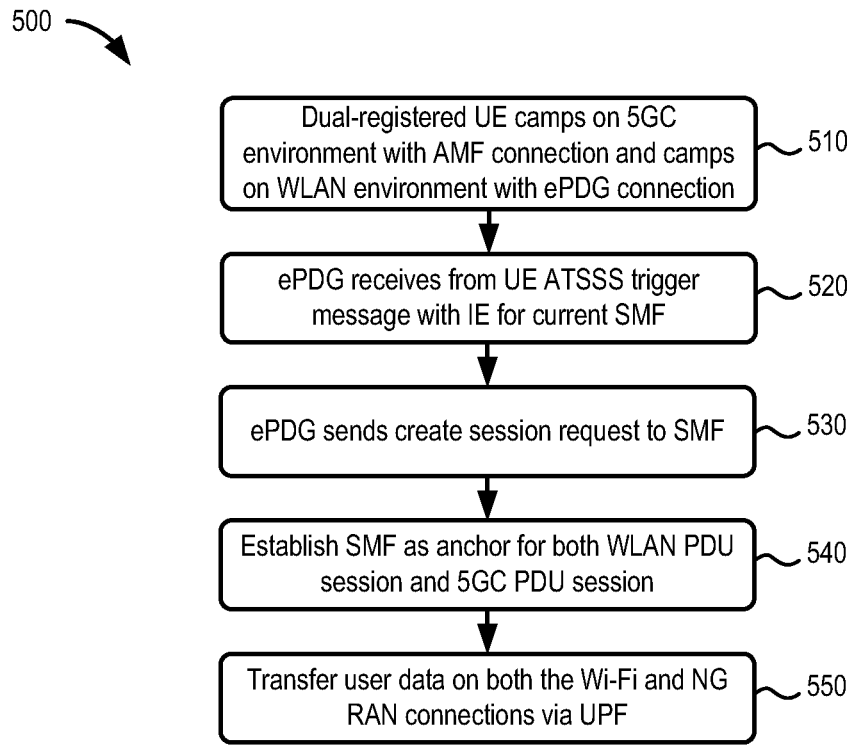
FIG. 5 is a flow diagram illustrating an exemplary process for network function relocation to support an Access Traffic Steering, Switching and Splitting (ATSSS)-enabled evolved Packet Data Gateway (ePDG), according to an implementation described herein.

FIG. 5 is a flow diagram illustrating an exemplary process 500 for 5GC SMF/UPF relocation to support an ATSSS enabled ePDG, according to an implementation described herein. In one implementation, process 500 may be implemented by ePDG 210. In another implementation, process 500 may be implemented by an ePDG 210 in conjunction with one or more other devices in network environment 100.

Referring to FIG. 5, process 500 may include a dual-registered UE camping on a 5GC environment with an AMF connection and camping on a WLAN environment with an ePDG connection (block 510). For example, according to one implementation, UE 110 may support dual connectivity with 5G cellular and Wi-Fi, and may connect to send/receive data via cellular PDU session 310 and WLAN PDU session 320.

Process 500 may further include receiving an ATSSS trigger message from the UE (block 520) and sending a create session request to the SMF (block 530). For example, UE 110 may submit an ATSSS trigger 410 to request ATSSS services from ePDG 210. The ATSSS trigger message may include an SMF identifier for the SMF of cellular PDU session 310. ePDG 210 may receive ATSSS trigger 410 and, in response submit a create session request to SMF/UPFc 330/340.

Process 500 may further include establishing the SMF as an anchor for both the WLAN PDU Session and 5GC PDU session (block 540) and transferring user data on both the Wi-Fi and NG RAN connections via the UPF (block 550). For example, in response to the ATSSS trigger message, ePDG 210 may send a request to SMF+PGW-C 220 to merge the 5GC PDU session and the WLAN PDU session into a single registration or session. From AMF 240, cellular PDU session 310 may be redirected through SMF+PGW-C 220 and UPF+PGW-U 225 to data network 160. From ePDG 210, WLAN PDU session 320 may also be redirected through SMF+PGW-C 220 and UPF+PGW-U 225 to data network 160.

Figure 6:
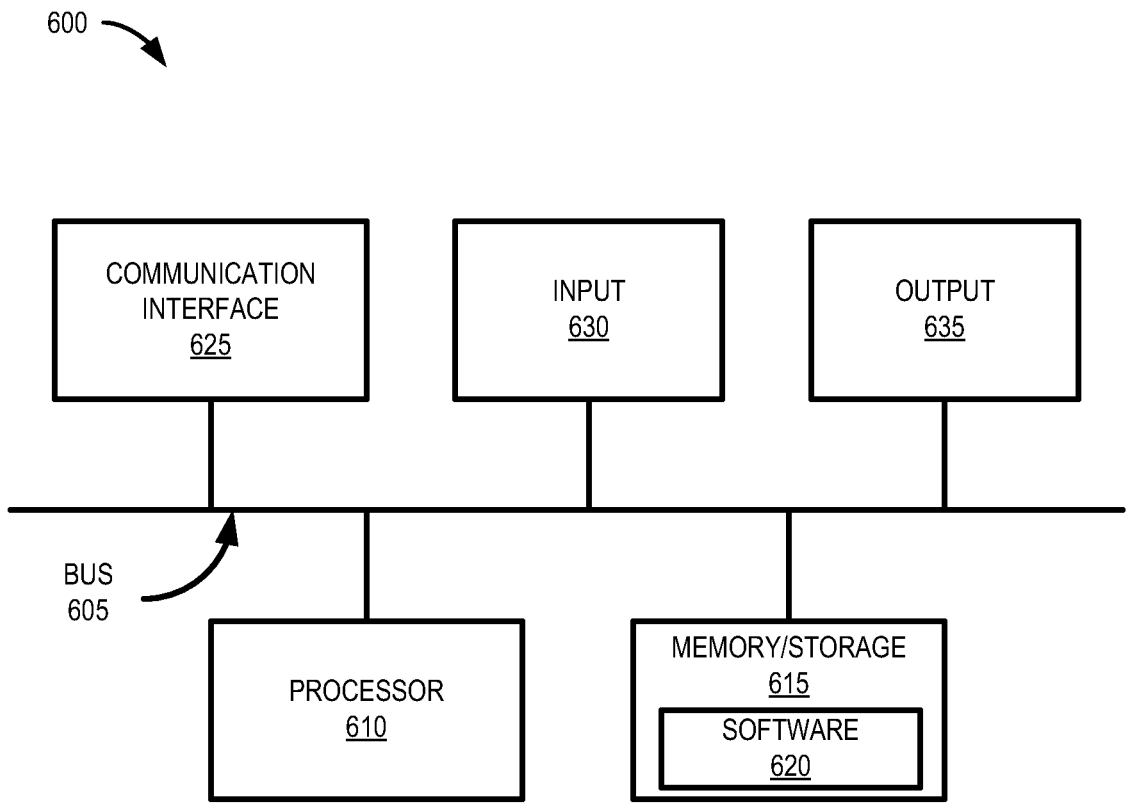
FIG. 6 is a diagram of exemplary components that may be included in one or more of the devices described herein.

FIG. 6 is a diagram illustrating exemplary components of a device 600 that may correspond to one or more of the devices described herein. For example, device 600 may correspond to components included in network environment 100, network portion 200, or network portion 300. As illustrated in FIG. 6, according to an exemplary embodiment, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, and/or clocks.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc. Processor 610 may be a dedicated component or a non-dedicated component (e.g., a shared resource).

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include a drive for reading from and writing to the storage medium.

Memory/storage 615 may be external to and/or removable from device 600, such as, for example, a Universal Serial Bus (USB) memory stick, a dongle, a hard disk, mass storage, off-line storage, network attached storage (NAS), or some other type of storing medium. Memory/storage 615 may store data, software, and/or instructions related to the operation of device 600.

Software 620 includes an application or a program that provides a function and/or a process. Software 620 may include an operating system. Software 620 is also intended to include firmware, middleware, microcode, hardware description language (HDL), and/or other forms of instruction. Additionally, for example, UE 110 may include logic to perform tasks, as described herein, based on software 620.

Communication interface 625 permits device 600 to communicate with other devices, networks, systems, devices, and/or the like. Communication interface 625 includes one or multiple wireless interfaces and/or wired interfaces. For example, communication interface 625 may include one or multiple transmitters and receivers, or transceivers. Communication interface 625 may include one or more antennas. For example, communication interface 625 may include an array of antennas. Communication interface 625 may operate according to a protocol stack and a communication standard. Communication interface 625 may include various processing logic or circuitry (e.g., multiplexing/de-multiplexing, filtering, amplifying, converting, error correction, etc.).

Input 630 permits an input into device 600. For example, input 630 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 635 permits an output from device 600. For example, output 635 may include a speaker, a display, a light, an output port, and/or some other type of visual, auditory, tactile, etc., output component. According to some embodiments, input 630 and/or output 635 may be a device that is attachable to and removable from device 600.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Systems and methods described herein enable 5GC network function (e.g., SMF/UPF) relocation to support ATSSS-enabled ePDGs. UE devices may be configured to provide ATSSS trigger messages and the ePDG is upgraded to support ATSSS for 5G networks. According to an implementation, an ePDG receives an ATSSS trigger message from a UE device when the UE device is connected with a first session (e.g., a 5G cellular session) using an SMF and a second session (e.g., a WLAN session) using a PGW. The ATSSS trigger message may include an SMF identifier for the SMF. The ePDG may extract the SMF identifier from the ATSSS trigger message and send a request to the SMF to merge the first session and the second session into a single registration or session. The SMF may process the request to create a new session registration and inform the ePDG. The ePDG may receive a session confirmation from the SMF and forward the session confirmation to the UE device. Upon receiving the confirmation, the UE device may initiate a delete session trigger for the WLAN session over the PGW. The ePDG may receive the delete session trigger from the UE device and send the delete session request to the PGW to delete the session.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112 (f) unless the claim element expressly includes the phrase "means for" or "step for."

What is claimed is:

1. A method, comprising:
receiving, by an evolved packet data gateway (ePDG), an access traffic steering, switching and splitting (ATSSS) trigger message from a user equipment (UE) device,
wherein the UE device is connected to a network via a first session using a session management function (SMF),
wherein the UE device is connected to the network via a second session using a packet data network (PDN) gateway (PGW), and
wherein the ATSSS trigger message includes an SMF identifier for the SMF; and
sending, by the ePDG and in response to the ATSSS trigger message, a request to the SMF to merge the first session and the second session into a single registration.

2. The method of claim 1, further comprising:
extracting the SMF identifier from an information element of the ATSSS trigger message.

3. The method of claim 1, further comprising:
receiving, by the ePDG, a session confirmation from the SMF; and
forwarding, by the ePDG, the session confirmation to the UE device.

4. The method of claim 3, further comprising:
receiving, by the ePDG, a delete session trigger from the UE device; and
sending, by the ePDG and in response to receiving the delete session trigger, a request to the PGW to delete the second session.

5. The method of claim 4, further comprising:
receiving, by the ePDG, a session deletion confirmation from the PGW; and
forwarding, by the ePDG, the session deletion confirmation to the UE device.

6. The method of claim 1, wherein the SMF includes a combined SMF and PGW-control plane function (SMF+PGW-C).

7. The method of claim 1, further comprising:
selecting, in response to the request to the SMF, a combined user plane function with PDN gateway-user plane (UPF+PGW-U).

8. The method of claim 1, wherein the first session includes a protocol data unit (PDU) session over a 5G core network, and wherein the second session includes a different PDU session over a wireless local area network (WLAN).

9. A system, comprising:
a network device including one or more processors configured to:
receive an access traffic steering, switching and splitting (ATSSS) trigger message from a user equipment (UE) device,
wherein the UE device is connected via a first session using a session management function (SMF),
wherein the UE device is connected via a second session using a packet data network (PDN) gateway (PGW), and
wherein the ATSSS trigger message includes an SMF identifier for the SMF; and
sending, in response to the ATSSS trigger message, a request to the SMF to merge the first session and the second session into a single registration.

10. The system of claim 9, wherein the network device includes an evolved packet data gateway (ePDG).

11. The system of claim 9, wherein the ATSSS trigger message includes the SMF identifier in an information element.

12. The system of claim 11, wherein the one or more processors are further configured to:
receive a session confirmation from the SMF; and
forward the session confirmation to the UE device.

13. The system of claim 12, wherein the one or more processors are further configured to:
receive a delete session trigger from the UE device; and
send, in response to receiving the delete session trigger, a request to the PGW to delete the second session.

14. The system of claim 13, wherein the one or more processors are further configured to:
receive a session deletion confirmation from the PGW; and
forward the session deletion confirmation to the UE device.

15. The system of claim 9, wherein the one or more processors are further configured to:
select, in response to the request to the SMF, a combined user plane function with PDN gateway-user plane (UPF+PGW-U).

16. The system of claim 9, wherein the first session includes a protocol data unit (PDU) session using a 5G new radio access network, and wherein the second session includes a different PDU session using a wireless local area network (WLAN).

17. A non-transitory computer-readable medium containing instructions executable by at least one processor of an evolved packet data gateway (ePDG), the non-transitory computer-readable medium comprising one or more instructions for:
receiving an access traffic steering, switching and splitting (ATSSS) trigger message from a user equipment (UE) device,
wherein the UE device is connected via a first session using a session management function (SMF),
wherein the UE device is connected via a second session using a packet data network gateway (PGW), and
wherein the ATSSS trigger message includes an SMF identifier for the SMF; and
sending, in response to the ATSSS trigger message, a request to the SMF to merge the first session and the second session into a single registration.

18. The non-transitory computer-readable medium of claim 17, wherein the instructions for receiving the ATSSS trigger message include instructions for:
extracting the SMF identifier from an information element of the ATSSS trigger message.

19. The non-transitory computer-readable medium of claim 17, further comprising instructions for:
receiving a delete session trigger from the UE device; and
sending, in response to receiving the delete session trigger, a request to the PGW to delete the session.

20. The non-transitory computer-readable medium of claim 17, wherein the first session includes a protocol data unit (PDU) session over a 5G core network, and wherein the second session includes a different PDU session over a wireless local area network (WLAN).

* * * * *